Nov. 10, 1970   I. NICOLAU   3,538,764
WEIGHT INDICATOR AND DRILLING CABLE ANCHOR
Filed Nov. 21, 1967   2 Sheets-Sheet 1
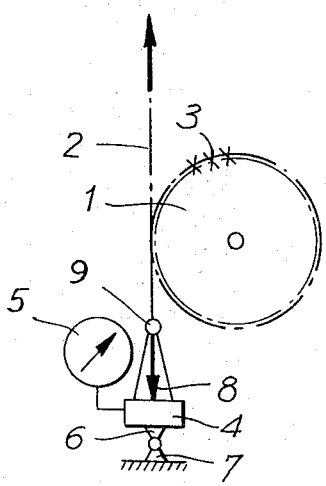
FIG.1a
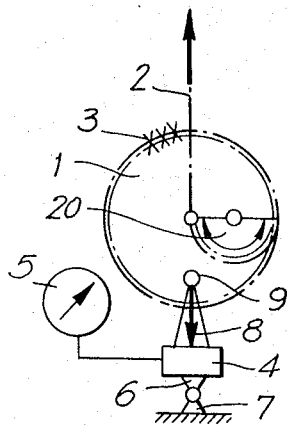
FIG.1b
FIG.1c
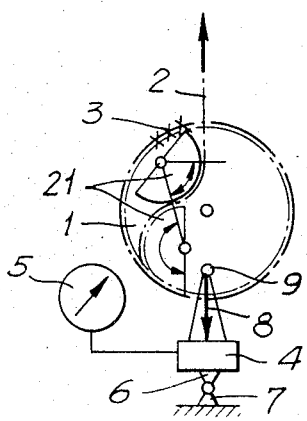
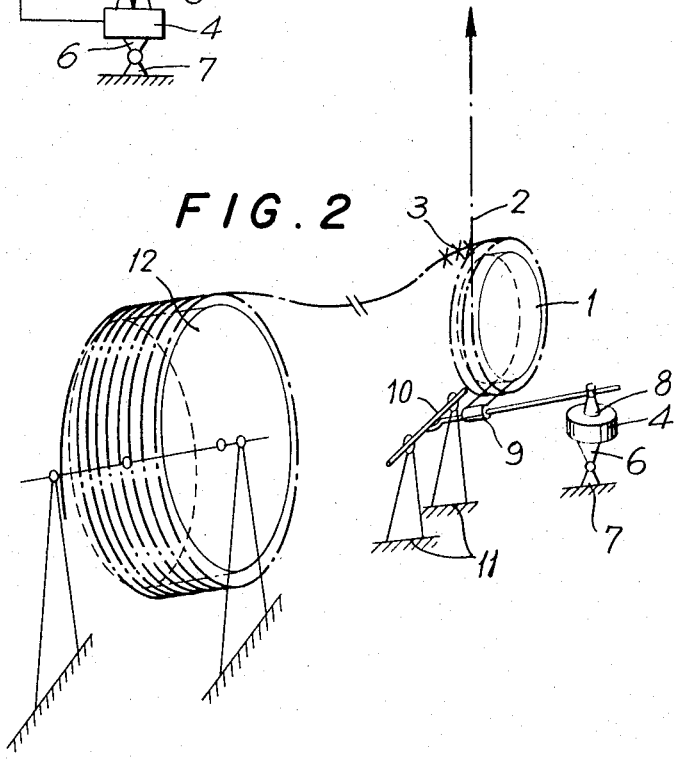
FIG.2

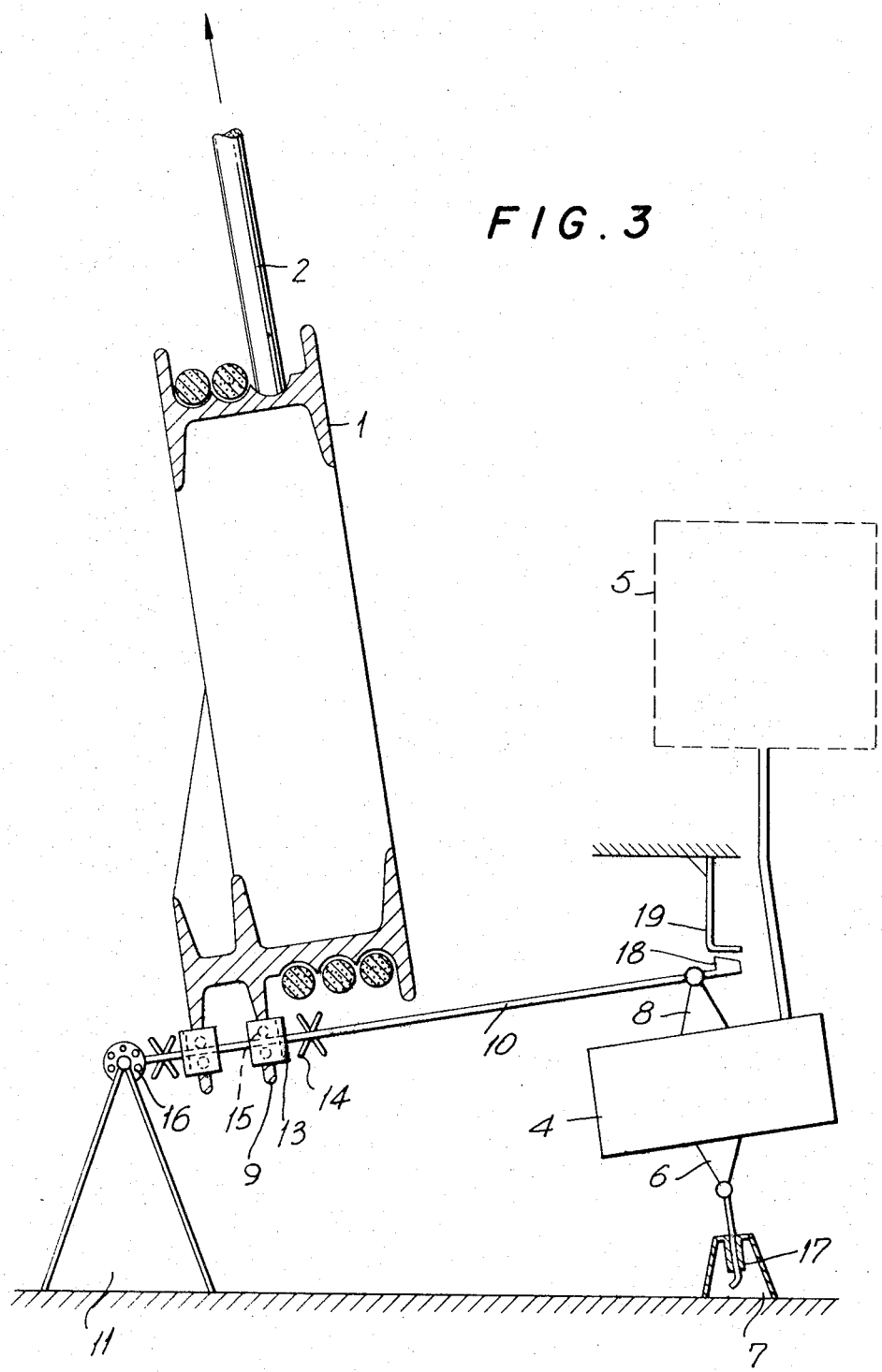

United States Patent Office 3,538,764
Patented Nov. 10, 1970

3,538,764
WEIGHT INDICATOR AND DRILLING
CABLE ANCHOR
Ion Nicolau, Cimpina, Rumania, assignor to Institutul
de Cercetare si Prorectare Technologica Pentru Industria Extractive de Titei
Filed Nov. 21, 1967, Ser. No. 684,672
Claims priority, application Rumania, Nov. 22, 1966, 52,571
Int. Cl. G01l 5/04
U.S. Cl. 73—143                                                11 Claims

ABSTRACT OF THE DISCLOSURE

A device for measuring the load imposed on the dead end of a hoisting line and for anchoring the line on a snubbing drum which is anchored to the rig floor via a dynamometer transducer either directly or by means of an adjustable reduction lever, an eccentric linkage being provided which is integral with the snubbing drum and is mounted outside the winding surface of the hoisting line and is connected to the transducer in alignment with the cable extending from the drum.

BRIEF SUMMARY OF THE INVENTION

The invention relates to an indicator device serving both for measuring the load imposed upon a drilling cable and for anchoring the dead end of the drilling cable. The drilling cable is of the type commonly used in oil and gas well drilling.

Most force indicators now in use operate on the deflected line principle with the cable being reeled upon a snubbing drum of the usual type, the snubbing drum being anchored by means of a pin which is eccentric relative to the drum's axis of rotation. Such indicators have, however, the disadvantage of leading to substantial errors of about 30%.

Another type of indicator operates on the wheel and lever principle. It comprises a snubbing drum on which the hoisting cable dead end is wound, the snubbing drum carrying an arm for transmitting to a dynamometer transducer the peripheral force arising as a result of the tendency of the snubbing drum to rotate. This indicator permits both the frictional anchoring of the dead end of the hoisting cable and the measurment of the load imposed upon the cable. The errors in the measured values are, however, relatively high, about 3–4%, owing to disturbing factors changing the theoretical operating span of the drum peripheral force. Such disturbing factors are the change in the cable diameter when various cable types are used, and flattening or stiffening of the cable, etc.

Another type of indicating device is that which does not use a dead end snubbing drum, the cable dead end being firmly attached to a shackle anchored to the ring floor. This arrangement permits the cable load to be directly measured by interposing a dynamometer transducer between the shackle and the dead end, thus limiting the measurement error to the transducer error, i.e. about 1–2%. This manner of anchoring the hoisting cable, only by means of clamps, has the disadvantage of imposing undesirable stresses upon the cable, which limits the use of this weight indicator type to light duty rigs rated for low loads.

The weight indicator according to the present invention eliminates these disadvantages in that it provides for continuous self-alignment between the drilling cable axis and the center of an oscillating linkage which is integral with and connects the snubbing drum to a dynamometer transducer, the self-alignment being independent of the cable characteristics. The snubbing drum can be connected to the dynamometer transducer either directly by means of the oscillating linkage placed eccentrically outside the theoretical cable spooling circle or by means of a system for reducing the load transmitted to the transducer, the snubbing drum being anchored to the rig floor or substructure only through the medium of the transducer or the system for reducing the cable load. This arrangement allows the snubbing drum to freely oscillate or pivot and the cable load to be thus at all times transmitted to the dynamometer transducer.

BRIEF DESCRIPTION OF THE DRAWING

FIG. 1a is a schematic representation of a first embodiment of a load indicator according to the present invention;

FIG. 1b is a schematic representation of a second embodiment of a load indicator according to the present invention;

FIG. 1c is a schematic representation of a third embodiment of a load indicator according to the present invention;

FIG. 2 is a perspective view, schematically showing the first embodiment of the load indicator; and FIG. 3 is a cross-sectional view of the first embodiment of the load indicator according to the present invention.

DETAILED DESCRIPTION

The invention will next be described with reference to the embodiments shown in the drawing. The same elements in these embodiments are given the same reference numerals.

The load indicator according to the first embodiment of the invention as shown in FIG. 1a, comprises a snubbing drum 1 whose spooling diameter depends on the diameter of cable 2, a few loops of the dead end of cable 2 being wound upon the snubbing drum for frictional anchoring of the cable, said cable being also securely clamped by use of clamps 3. The dead end load of cable 2 is transmitted to a dynamometer transducer 4 and the measured load is indicated on a dial gage 5. Means (not shown) can also be provided to record the measured load. When the total load imposed on cable 2 is to be transmitted to the transducer 4, the latter is flexibly connected at its end 6 to a base 7 anchored to the rig floor or substructure and its other end is connected to an oscillating linkage 9 integral with the drum 1. The oscillating linkage is laterally positioned with respect to the spooling circle of cable 2 (as shown in FIG. 3) in order to permit cable spooling. If only part of the total load imposed on cable 2 is to be transmitted to the dynamometer transducer 4 (in order to limit the size of the dynamometer transducer 4 when the cable load has a high rated value) the transducer is connected as shown in FIG. 2 where end 6 is connected to the base 7 as before, while the other end 8 is pivotally connected to a lever 10 which by a suitable reduction ratio permits only part of the total load imposed on cable 2 to be transmitted to the dynamometer transducer. The lever 10 which can be set to a desired reduction ratio, is pivotably connected to the snubbing drum 1 by the oscillating linkage 9, so that the snubbing drum 1 can freely oscillate in a plane normal to the lever 10. For anchoring the lever 10 to the rig floor a support 11 is used, the lever being pivotably connected thereto.

In order to achieve alignment between the axis of cable 2 and the center of the connection of the dynamometer transducer 4 to the snubbing drum 1, the oscillating linkage 9 integral with the snubbing drum, is eccentric and located externally with respect to the theoretical spooling circle of the snubbing drum 1. The load imposed on the cable 2 is thus directly transmitted to the dynamometer transducer 4, thereby eliminating the errors which may arise from changing the cable diameter, flattening of the cable against the drum face, stiffening of the cable, etc. The errors in the measured values of the cable load are thus reduced to the error of the dynamometer transducer 4, which is similar to the ideal case when no snubbing drum is used for anchoring the dead end line. This is made possible by the snubbing drum 1 being free to oscillate owing to the oscillating linkage 9 integral with the drum and connecting it to the dynamometer transducer 4, achieving thereby self-alignment between the axis of the hoisting cable 2 and the center of the oscillating linkage 9. The dead end of the cable 2 is wound upon the snubbing drum 1 so as to permit renewal of the highest wear portions of the cable 2, reeved between the draw works, traveling block and the crown block, by unreeling this particular portion of the cable from the feeding cable drum 12 onto the snubbing drum 1, in order to achieve uniform wear of the cable. This does not require removal of the transducer 4 from its normal working position. Also, by suitably locating the feeding cable drum 12, the reeling direction of cable 2 will be the same both for the drum 12 and for the snubbing drum 1.

For measuring the drilling cable load, the dynamometer transducer 4 can be of the tension type, as shown in FIG. 3, or it may be of the compression type in which case a yoke or other suitable means for reversing the load direction is used.

The snubbing drum 1 is pivotally supported on the lever 10 by the eccentric linkage 9 whose lateral movement is limited by the adjustable limit means 13 provided with the stops 14. In order to minimize friction in the connections, double bearings 15 and 16 are used, enabling the snubbing drum 1 and the lever 10 to pivot freely. Adjustment of the working position of the dynamometer transducer 4 is effected by screw 17 which permits axial positioning of the end 6 of the transducer 4 with respect to the base 7 anchored to the rig floor. In removing the transducer 4 for checking or replacing, the dead line 2 can be kept under load. This is made possible by a buffer member 18 which is provided on lever 10 and which is adapted to contact a stationary supporting shoulder 19. The transducer 4 can be removed by unscrewing the screw 17 and propping the buffer 18 against the supporting shoulder 19, while cable 2 remains under load. In this way, the drilling rig can operate independently of the transducer operation, the snubbing drum 1 being designed so as to anchor the dead end of the cable 2 even after removal of the transducer 4.

In the second embodiment in FIG. 1b, the load indicator is similar to that described above, except that the snubbing drum 1 is provided with a deflector 20 of semicircular shape, which permits the dead line 2 to be deflected about 180°. The deflector 20 makes it possible for the dead line 2 to be reeled upon the snubbing drum 1 so that the axis of the dead line passes through the center of the oscillating linkage 9 integral with the snubbing drum 1 and connecting it to the transducer 4, to obtain self-alignment between the axis of dead line 2 and the center of the oscillating linkage 9. In this way the load imposed on the cable 2 can be directly transmitted to the dynamometer transducer 4.

The load indicator shown in the third embodiment of FIG. 1c is similar to that shown in FIG. 1a, with the exception that the snubbing drum 1 is provided with an S-shaped deflector 20 made up of two semicircular sheaves whose radii are about half that of the snubbing drum 1. The sheaves are arranged to deflect the cable 2 about 90° while reeling it on the drum 1.

The advantages of the load indicator according to the present invention are the following:

a single device simultaneously achieves the frictional anchoring of the dead end of a hoisting or drilling cable and the accurate measurement of the load imposed on the said cable;

it permits replacement of the dead end of the hoisting cable so as to periodically distribute the wear over the whole length of the cable;

it is possible to adjust the reduction ratio of the load transmitted from the hoisting cable to the dynamometer transducer;

the dynamometer transducer can be easily removed while the hoisting cable remains under load and without stopping the drilling rig operation.

What is claimed is:

1. An indicator device for a load imposed on a cable comprising a snubbing drum to which an end of the cable is secured and around which at least one turn of the cable is wound, the cable extending from the drum and being subject to the load, a linkage fixedly secured to said drum and having a pivotal connection point in alignment with the cable extending from the drum, a dynamometer transducer, and means connecting said transducer to said linkage at said connection point such that the transducer is in permanent self-alignment with the cable extending from the drum while the linkage and snubbing drum therewith is freely pivotable about said connection point thus enabling the load on the cable to be directly transmitted to the transducer.

2. A device as claimed in claim 1, wherein said linkage is externally secured to said drum and said connection point is eccentric to the center of the surface of the drum on which the cable is wound.

3. A device as claimed in claim 1 comprising means on said drum for deflecting the cable from the surface of the drum through an angle of 180° into alignment with the connection point.

4. A device as claimed in claim 3, wherein said deflecting means is a semicircular deflector extending from the surface of the drum and having a radius which is one-half that of the snubbing drum.

5. A device as claimed in claim 1 comprising an S-shaped deflector on said drum for deflecting the cable from the surface of the drum through an angle of 90°, said S-shaped deflector comprising two semicircular sheaves whose radii are about one-half that of the snubbing drum.

6. An indicator device for a load imposed on a cable comprising a snubbing drum to which an end of the cable is secured and around which at least one turn of the cable is wound, the cable extending from the drum and being subject to the load, a linkage fixedly secured to said drum, a lever, means connecting the linkage to said lever at a connection point for pivotable movement about an axis which intersects a line drawn through the cable extending from the drum such that said axis and line define a plane, a dynamometer transducer pivotably connected to said lever at a location on said axis and with an orientation such that the transducer is permanently aligned in said plane when the cable is subject to load, while the linkage and snubbing drum therewith is freely pivotable about said connection point.

7. A device as claimed in claim 6 comprising means for supporting the transducer from a stationary support for height adjustment thereof along a line parallel to the cable extending from the drum.

8. A device as claimed in claim 6, wherein said lever has one end pivotably supported at a fixed position, said transducer being pivotably connected to the lever at an opposite end thereof, said connection point of said linkage to said lever being intermediate the ends thereof, whereby a portion of the load in the cable is transferred to the transducer.

9. A device as claimed in claim 8, wherein said means which connects said linkage to said lever at said connection point is adjustable along the lever to vary the portion of the load which is transferred to the transducer.

10. A device as claimed in claim 9 comprising limit means on said linkage at said connection point and stop means on said lever for limiting movement of the linkage along the lever.

11. A device as claimed in claim 8, wherein said transducer is detachable from the lever at said opposite end thereof, the device further comprising means for engaging said opposite end of the lever with the transducer detached whereby the cable can remain under load.

References Cited

UNITED STATES PATENTS

| | | | |
|---|---|---|---|
| 2,700,304 | 1/1955 | Decker | 73—143 |
| 2,807,957 | 10/1957 | Decker | 73—143 |

CHARLES A. RUEHL, Primary Examiner

U.S. Cl. X.R.

177—132